(12) United States Patent
Snead

(10) Patent No.: US 6,192,804 B1
(45) Date of Patent: Feb. 27, 2001

(54) HYDRAULICALLY ACTUATED RAILWAY CAR DUMPING SYSTEM

(76) Inventor: Edwin Snead, 3006 Gabriel View, Georgetown, TX (US) 78626

( * ) Notice: Subject to any disclaimer, the term of this patent is extended or adjusted under 35 U.S.C. 154(b) by 0 days.

(21) Appl. No.: 09/148,266

(22) Filed: Sep. 4, 1998

Related U.S. Application Data

(60) Provisional application No. 60/057,960, filed on Sep. 5, 1997.

(51) Int. Cl.$^7$ .................................................... B61D 9/00
(52) U.S. Cl. ......................... 105/274; 105/269; 105/286
(58) Field of Search ........................... 105/239, 261.1, 105/261.2, 263, 264, 265, 269, 270, 271, 272, 274, 286; 298/10, 17 R, 18, 19 R, 22 R, 22 C, 22 P

(56) References Cited

U.S. PATENT DOCUMENTS 4,407,202   10/1983   McCormick ......................... 105/271

OTHER PUBLICATIONS

International Search Report dated Oct. 26, 1998 (PCT/US98/18549) (GEOE:064P).

Primary Examiner—Mark T. Le
(74) Attorney, Agent, or Firm—Howrey Simon Arnold & White, LLP

(57) ABSTRACT

A hydraulically operated side dump railroad car that operates by utilizing high pressure hydraulic fluid from delivered by a pneumatic to hydraulic converter pump located on the railroad car. On the railroad dump car, the hydraulic fluid is pumped from a hydraulic fluid reservoir to the hydraulic ram assembly of the car, without the use of an accumulator for storing pressurized hydraulic fluid. On the other hand, an existing railroad dump car having existing pneumatic equipment can easily retrofitted with the hydraulic system of the present invention with the use of standard train air brake piston and cylinders.

14 Claims, 4 Drawing Sheets

HYDRAULICALLY ACTUATED RAILWAY CAR DUMPING SYSTEM

This application claims the benefit of U.S. Provisional Application Ser. No. 60/057,960 filed Sep. 5, 1997.

BACKGROUND OF THE INVENTION

1. Field of the Invention

The present invention relates to railroad dump cars. In particular, the present invention is a hydraulically powered system for operating the dumping mechanism of the dump car.

2. Description of the Prior Art

Side dump railroad cars are used for carrying and unloading bulk materials. The typical car comprises a frame with wheels and a pivotally connected hopper body. The body characteristically consists of side doors that open when the body is tilted at an angle sufficient to discharge the bulk material.

These present-day side-dump railroad cars are actuated by pneumatic rams that are attached to the frame of the car. Upon actuation, a piston raises the bed on one end, discharging the material over the other side of the car through the opened side door.

The source of compressed air to drive these rams is from an air compressor inside of the locomotive. A disadvantage to the use of pneumatic rams, however, is that they are (i) large, (ii) expensive to service, (iii) because they operate by air pressure, they are difficult to control and regulate under varying load conditions, and (iv), are susceptible to condensing and freezing of water vapor in the rail air lines and system components during cold winter months, thus causing blockage.

Probably most important from a safety standpoint relates to the difficulty of precisely controlling the movement of the dump body. This is because high pressure is initially required to begin the dumping process and as the load is removed, less pressure is required to complete the dumping process. When this condition occurs, the reduced compression of the air in the pneumatic ram causes a large and rapid travel in the piston, completing the dumping in an uncontrolled manner. This inability to control the rate of dumping as the load is removed causes great stress on all components of the dump car as the dump bed is slammed to the travel stops.

Others have attempted to solve this problem by replacing the pneumatic rams with hydraulic drive rams. A major disadvantage inherent in some systems, such as that depicted in McCormick, U.S. Pat. No. 4,407,202, is the use of a hydraulic accumulator attached to each railroad car to store hydraulic fluid pressure. This accumulator poses a potential safety problem, since hydraulic fluid may be at a pressure of 3000 psi or greater, a valve failure could cause the car to dump unexpectedly, having serious consequences. Therefore, a hydraulically operated side dump railroad car having a dump mechanism that operates at approximately the same rate as a car equipped with a hydraulic accumulator would be an important advancement for railroad operators.

SUMMARY OF THE INVENTION

The present invention seeks to overcome these and other disadvantages present in the prior art by providing a side dump railroad car that is operated by hydraulic rams but does not require a hydraulic accumulator. Utilizing compressed air from the locomotive or other source, the system for generating hydraulic pressure, in its basic form, includes a pair of opposing air brake cylinders whose actuating arms are connected to a pivoting lever. This lever in turn is connected to the piston of a double-acting hydraulic pump. This hydraulic pump in turn is operatively linked to at least one hydraulic ram that is capable of lifting the dump bed.

When the pump mechanism is actuated, air travels into a first air brake actuator and causes movement of its piston outwardly. This piston is connected by a first connecting arm to a centrally located pivot arm, which moves outwardly from the first air brake actuator. The pivot arm is connected to a hydraulic ram, which in turn moves and generates hydraulic fluid pressure. When the first air brake actuator connecting arm reaches its maximum travel, a valve is actuated, allowing air to fill the second opposing air brake actuator and release air pressure from the first air brake actuator. A piston in the second air brake actuator is connected to a second connecting arm that is also connected to the pivot arm. The pivot arm is then moved in the opposite direction by the second connecting arm, causing another stroke of the hydraulic ram and generation of additional hydraulic fluid pressure. When the second air brake actuator connecting arm reaches its maximum travel, a valve is actuated, allowing air to fill the first opposing air brake actuator and release air pressure from the second air brake actuator. In this manner, air pressure is converted to hydraulic pressure to activate the car's lift system.

Operation of the dumping mechanism is commenced by a hydraulic valve that selectively causes the hydraulic fluid pressurized by the converter pump to flow into at least one hydraulic ram. The pressurized hydraulic fluid causes the hydraulic ram to move the dump bed causing removal of materials contained therein. Also, an advantage of the present system is the ability to hold a dump body in mid-position for extended periods of time, unlike pneumatically-driven systems.

Noteworthy in the present system is the lack of an oil or hydraulic accumulator tank or device. Hydraulic fluid is pumped from a hydraulic fluid reservoir directly into the hydraulic rams that lift the dump bed. The oil reservoir of the present invention serves as a supply source for the hydraulic oil and as a return vessel for oil following use in the hydraulic drive rams. A pressure relief valve maintains the pressure in the oil reservoir well below that required to move the hydraulic drive rams, and thus the oil reservoir does not serve as a hydraulic accumulator. The present invention therefore provides a safer mechanism for moving the dump body of a side dump railroad car.

In other embodiments, it is envisioned that the hydraulic pump mechanism that converts pneumatic pressure to hydraulic pressure will be a part of each individual dump car. In alternative embodiments, a larger pneumatic to hydraulic system may be placed on an auxiliary railroad car and serve to actuate the hydraulic rams of a series of side-dump railroad cars. Moreover, it is contemplated that hydraulic power from a locomotive's hydraulic pump could be used to activate the dump car's hydraulic mechanism.

The hydraulic system of the present invention further eliminates safety problems that may occur when using a hydraulic storage accumulator that holds the hydraulic fluid pressure even after the air pressure source is disconnected. For example, should the hydraulic accumulator tank become compromised, the release of high pressure oil may be dangerous to railroad workers and equipment. Moreover, a safety hazard exists with accidental movement of the hydraulic valve, which may result in an unintended dumping of the car contents.

DETAILED DESCRIPTION OF THE PREFERRED EMBODIMENTS

The present invention is a side dump railroad car that is operated by hydraulic rams supplied with pressurized hydraulic fluid from a pneumatic to hydraulic converter pump. Utilizing compressed air from the locomotive, internal combustion engine, or other source, a pair of opposing air brake cylinders is actuated whereby actuating arms attached to the pneumatic air brake cylinders connected to the piston of a double-acting hydraulic pump. This hydraulic pump in turn is operatively linked to at least one hydraulic ram that is capable of lifting the dump bed. In preferred embodiments of the invention, each side dump railroad car carries its own pneumatic to hydraulic converter pump, such as the one set forth in FIG. 2. An advantage of such an arrangement is that each car may be independently dumped, irrespective of a common source of hydraulic pressure. Should a failure of one car's converter pump occur, however, then it is possible to operatively connect the adjacent car's converter pump to the failed car's hydraulic system to effectuate dumping of materials in the dump body.

Figure 1:
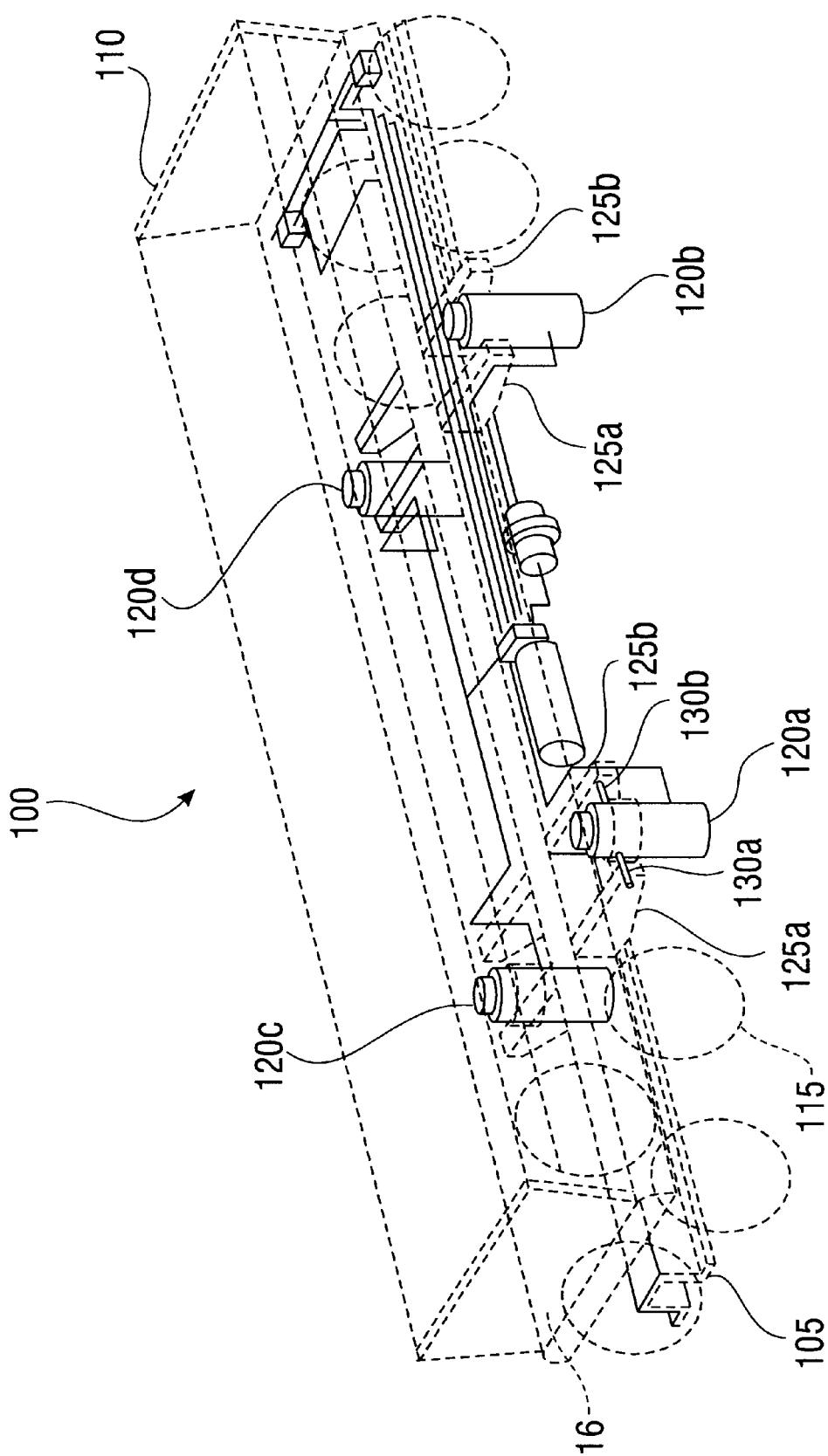
FIG. 1 is a perspective view showing a hydraulically powered side dump railroad car utilizing the present invention.

FIG. 1 shows the hydraulically actuated dump system as it is used on a conventional side dump rail car 100. Car 100 includes a conventional car frame 105 and a dump body 110 of conventional construction. Frame 105 also has wheels 115 operatively connected. In preferred embodiments, the present invention includes four hydraulic rams 120a, 120b, 120c, and 120d positioned two on each side of frame 105. Hydraulic rams 120a, 120b, 120c, and 120d are pivotally mounted to outward extending frame members 125a and 125b, preferably two per side of the car. Hydraulic rams 120a, 120b, 120c, and 120d are positioned on the opposite side of center sill 16 and are pivotally connected to outwardly extending frame members 125. The rams are pivotally connected to members 125a and 125b of car frame 105 at pivot points 130a and 130b as shown in FIG. 1, FIG. 3A and FIG. 3B. Hydraulic rams 120a, 120b, 120c, and 120d are telescopic hydraulic rams, which are pivotally connected at their upper ends to dump body 110 at pivot points 130a and 130b.

Figure 3:
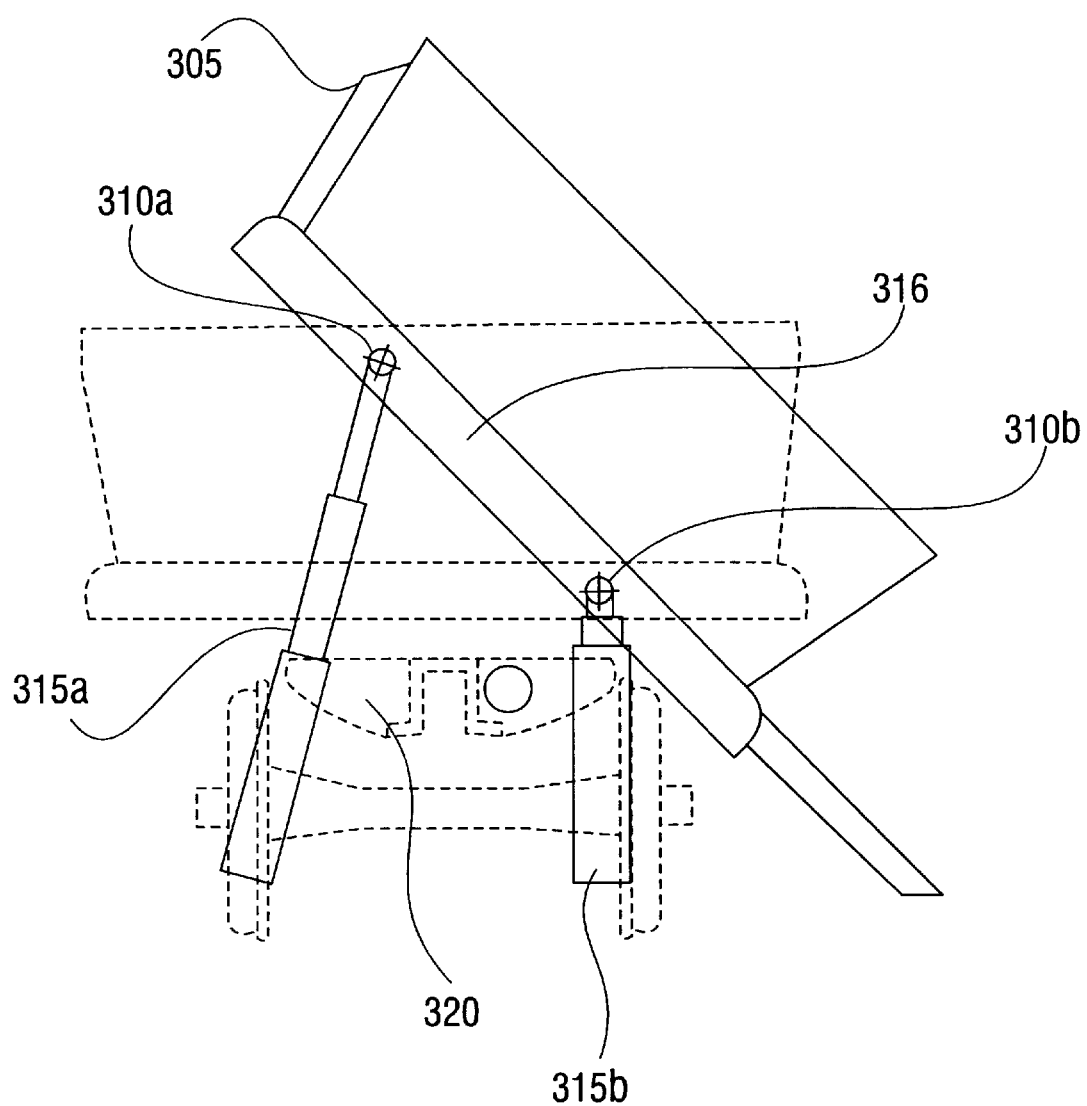
FIG. 3 is a sectional view showing the position of the hydraulic rams when pivoting the dump body for unloading.

To dump the contents of dump body 110 on one side of the car, hydraulic rams 120a and 120b are energized, thereby lifting the other side of dump body 110. FIG. 3 illustrates an embodiment similar to FIG. 1 in which a side of dump body 305 is lifted by an actuated ram 315a. Conversely, to dump the contents on the opposite side of the car, hydraulic rams 120c and 120d are actuated, thereby lifting their side of the dump body 110. In one typical embodiment of the present invention, hydraulic rams 120a, 120b, 120c, and 120d are telescopic-type hydraulic lift rams.

Figure 2:
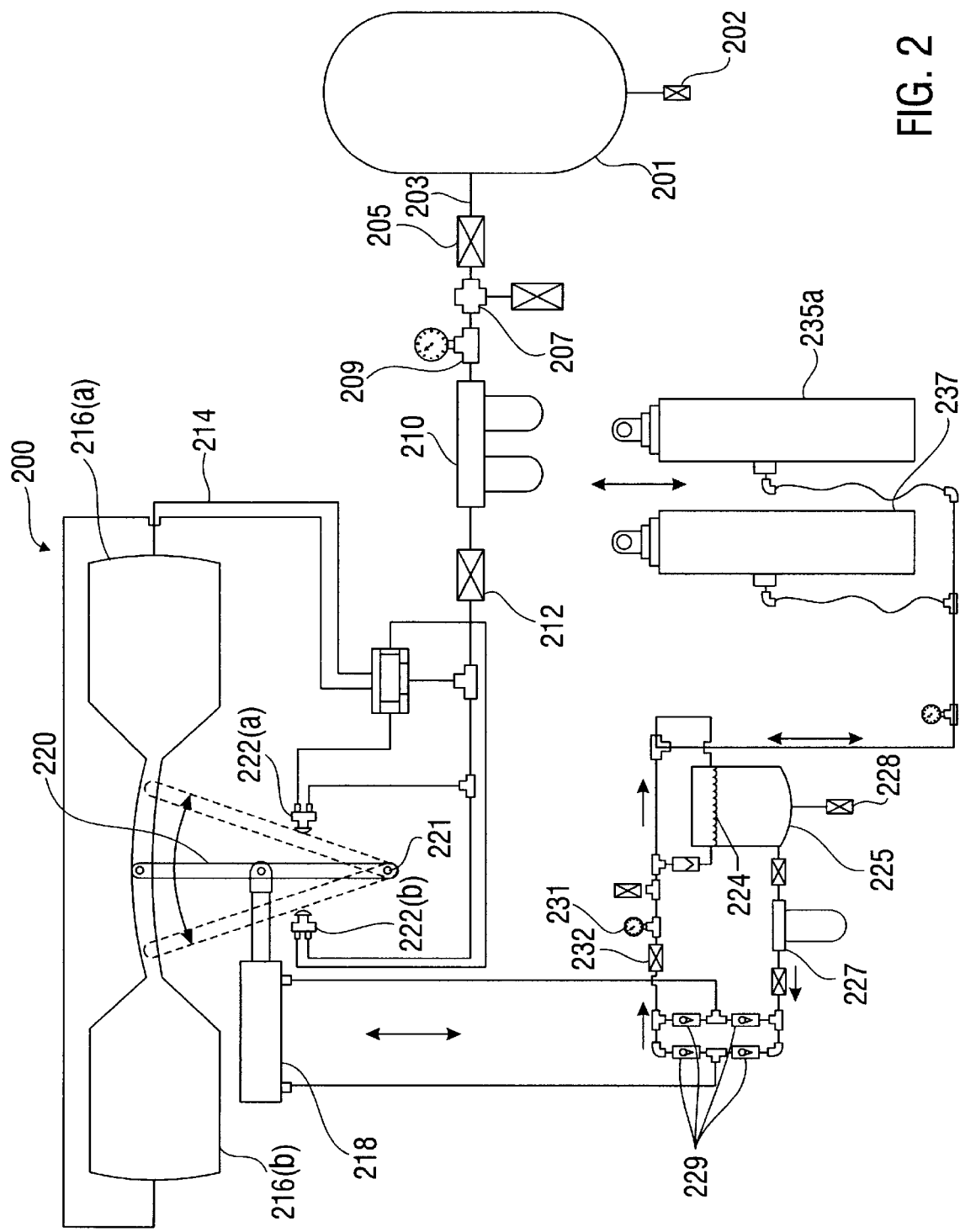
FIG. 2 is a schematic diagram of the hydraulic system of the present invention.

FIG. 2 shows a representative pneumatic to hydraulic converter pump 200 according to the present invention. In this illustrative embodiment, hydraulic fluid pressure is generated by utilizing the auxiliary air supply of the train supplied by auxiliary air input line 203 to actuate pneumatic ram 216a or 216b, which rams may be, for example, standard train brake air cylinders. In preferred embodiments, these cylinders are 12 inch air brake cylinders. Converter pump 200 may be part of each railroad car, or alternatively converter pump 200 may be on a separate railroad car and be hydraulically connected to a plurality of hydraulically operated dump cars.

In other embodiments, auxiliary air input line 203 is connected to the train's auxiliary air system and to air reservoir 201, to provide pressurized air at approximately 90 psi or above. Pneumatic to hydraulic converter pump 200 converts the low pressure air to a much higher hydraulic pressure to operate hydraulic rams 235a and 235b. Air reservoir 201 may have drain cock 202 connected thereto.

When control valve 212 is opened, air travels into first air brake cylinder 216a and causes movement of its piston outwardly. This piston is connected to centrally located pivot arm 220 pivotally connected at pivot point 221. Pivot arm 220 moves outwardly from first air brake cylinder 216a. Pivot arm 220 is further connected to hydraulic booster pump 218 that generates hydraulic fluid pressure. Hydraulic booster pump 218 may be, for example, a double acting hydraulic booster pump. When first air brake cylinder reaches its maximum travel, limit switch 222b is actuated, allowing air to fill second opposing air brake cylinder 216b, while releasing air pressure from first air brake cylinder 216a. Second air brake cylinder 216b is opposedly connected to pivot arm 220, which then moves in the opposite direction, causing another stroke of hydraulic booster pump 218 and generation of additional hydraulic fluid pressure. When second air brake cylinder 216b reaches its maximum travel, limit switch 222a is actuated, allowing air to fill first opposing air brake cylinder 216a while releasing air pressure from second air brake cylinder 216b.

Hydraulic fluid 224 is drawn from reservoir 225 through filter 227 and ball check valves 229 into hydraulic booster pump 218. Ball check valves 229 allow hydraulic fluid 224 to enter to hydraulic booster pump 218 at low pressure. When high hydraulic pressure is generated by hydraulic booster pump 218, hydraulic fluid exits at high pressure through ball check valves 229, through ported valve 232 and into drive rams 235a and 235b. Ported valve 232 controls hydraulic fluid flow into hydraulic drive rams 235a and 235b. In this manner, air pressure reciprocating between air cylinders 216a and 216b is converted to hydraulic pressure to activate the railroad car lift system.

Operation of the dumping mechanism is commenced by a hydraulic valve that selectively causes the hydraulic fluid pressurized by the converter pump to flow into at least one hydraulic ram. Pressurized hydraulic fluid 224 causes hydraulic ram 235a and 235b to move the dump bed, thus causing removal of materials contained therein. Also, an advantage of the present system is the ability to hold a dump body in mid-position for extended periods of time, unlike dump bodies that are lifted by pneumatic rams.

In the embodiment shown in FIG. 2, the hydraulically powered control system includes control valve 212, which may be actuated by the operator to cause rams 235a and 235b to be filled with hydraulic fluid 224. Lowering hydraulic rams 235a and 235b is accomplished by engaging valve 232 to release hydraulic fluid 224 back into reservoir 225. Pressure relief valve 228 prevents overpressure from developing in reservoir 225.

The operation of valve 212 causes dump body to be raised by rams 235a and 235b. It is recognized that rams 235a and 235b may be placed on either side of the car, to allow for dumping of car contents on either side. Hydraulic booster pump 218 increases the low air pressure that is typically generated by a locomotive air pump to hydraulic pressure of about 2,000 psi.

Figure 4:
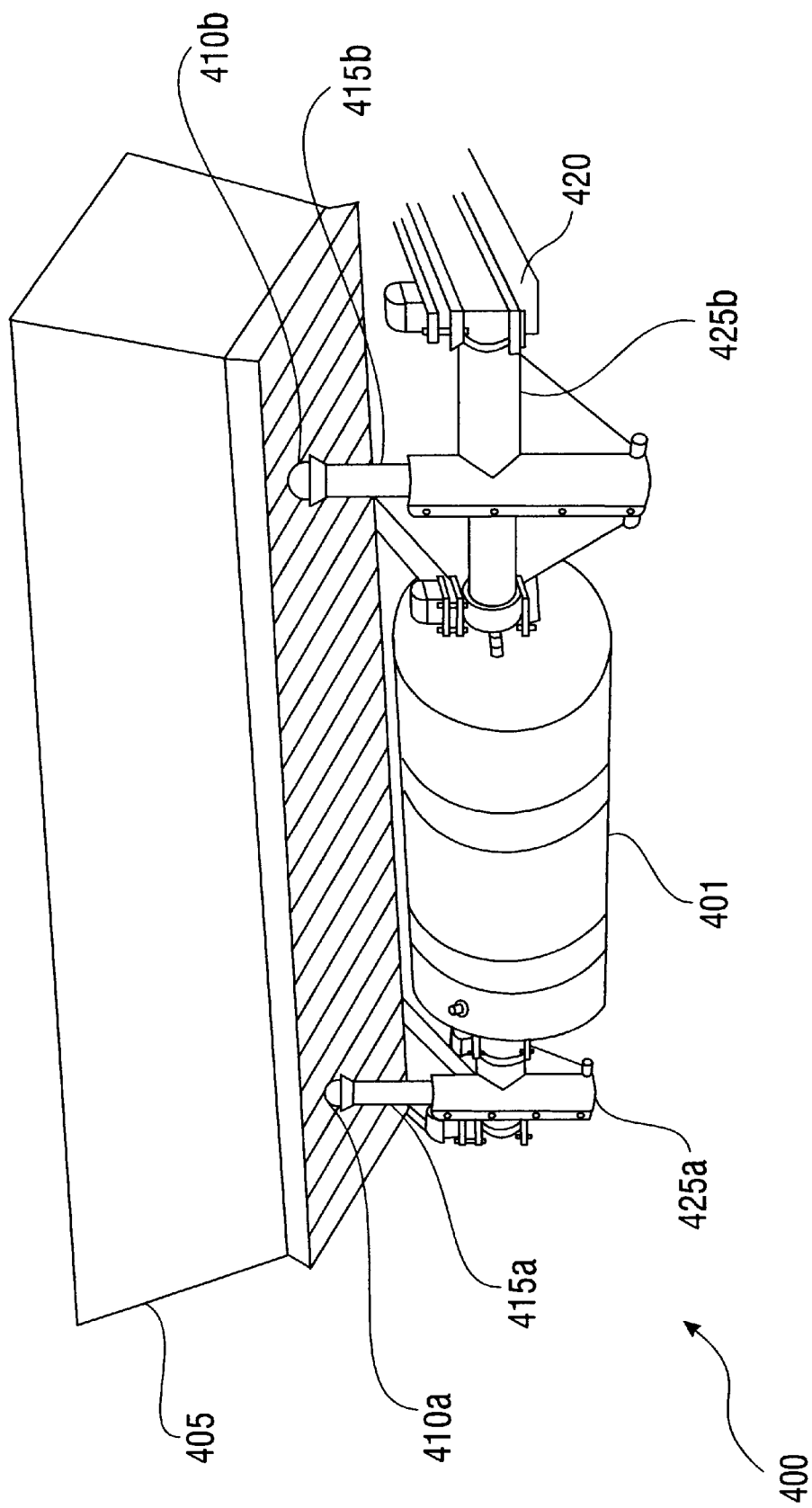
FIG. 4 shows a side view of the hydraulic rams in the process of tilting the dump body.

FIG. 3 shows an end perspective of a typical side dump railroad car of the present invention, showing dump bed 305 in a raised position following energizing of ram 315a with pressurized hydraulic fluid. The location of pivot points 310a and 310b between a bottom 316 of dump bed 305 and end of rams 315a and 315b are shown. In addition, rams 315a and 315b are pivotally connected to frame 320 of the side dump railroad car to allow free rotation. Ram 315b is shown in an unenergized state. If it is desired to lift dump body 305 on the opposite side, then ram 315a is unenergized, and ram 315b is filled with pressurized hydraulic fluid to lift dump body 305. FIG. 4 depicts a side view of side dump railroad car 400 showing rams 425a and 425b partially extended to lift dump body 405. Air reservoir 401 is shown attached to car frame 420, and supplies air pressure to operate pneumatic to hydraulic converter which in turn supplies hydraulic pressure to rams 425a and 425b. Hydraulic ram supports 425a and 425b are pivotally connected to frame 420, and support hydraulic rams 425a and 425b, allowing hydraulic rams 425a and 425b to pivotally rotate on car frame 420 as dump body 405 is raised. An aspect of hydraulic ram supports 425a and 425b is that they retrofit directly into the same frame supports that were used by the pneumatic rams. Thus, to retrofit a car from pneumatically powered rams to hydraulically powered rams is greatly simplified using the frame supports of the present invention.

In another preferred embodiment, the requirement for an auxiliary air line as the ultimate primary source of power can be eliminated entirely. In place of such an air driven pump, an auxiliary hydraulic pump may be employed to drive the hydraulic rams. The auxiliary hydraulic pump may be powered by, for example, an internal combustion engine. The principal advantage of this embodiment is that it does not require an auxiliary air line, and as such, allows side dump cars to be used in trains having cars not so equipped. In addition, such an auxiliary pump may be used to power a plurality of side-dump railroad cars so equipped.

It is also recognized that the present invention also has uses in other types of dump cars. Such cars include, for example, a bottom dump slide gate car or any other car in which a movable gate for unloading the contents of a railroad car is required.

The apparatus disclosed and claimed herein can be made and executed without undue experimentation in light of the present disclosure. While the apparatus and methods of this invention have been described in terms of preferred embodiments, it will be apparent to those of skill in the art that variations may be applied to the apparatus and in the steps or in the sequence of steps of the method described herein without departing from the concept, spirit and scope of the invention. More specifically, it will be apparent that certain dimensions of the various components making the invention, as well as methods of storage, deployment and attachments may be varied to achieve the same or similar results. All such similar substitutes and modifications apparent to those skilled in the art are deemed to be within the spirit, scope and concept of the invention as defined by the appended claims.

What is claimed is:

1. An improved railroad dump car for transporting bulk material in a side operated dump bed of the car, the improvement comprising:

a hydraulic reservoir including hydraulic fluid;

a converter pump driven by a source of pressurized air associated with the dump car, said pump for pressurizing hydraulic fluid received from the hydraulic reservoir;

a hydraulic ram assembly for tilting the dump bed of the dump car to cause dumping of the bulk material from the dump bed;

a valve assembly connected between the converter pump and the hydraulic ram assembly to selectively communicate pressurized hydraulic fluid from the converter pump to the hydraulic ram assembly to cause operation of the ram assembly and tilting of the dump bed;

wherein the hydraulic fluid does not communicate with means for storing pressurized hydraulic fluid.

2. The dump car according to claim 1, wherein the dump car has a car frame with the dump bed rotatably mounted to the car frame, and wherein the hydraulic ram assembly is mounted between the car frame and the dump bed.

3. The dump car according to claim 2, in which the hydraulic ram assembly is pivotally connected to the car frame and pivotally connected to the dump bed.

4. The dump car according to claim 2, rein the hydraulic ram assembly comprises a first hydraulic ram pivotally connected between the car frame and a first longitudinal side portion of the dump car.

5. The dump car according to claim 4, wherein the hydraulic ram assembly further comprises a second hydraulic ram pivotally connected between the car frame and a second longitudinal side portion of the dump bed opposed from the first longitudinal side.

6. The dump car according to claim 1, wherein the pressurized air is supplied by an auxiliary air supply of a railroad locomotive pulling the dump car.

7. The dump car according to claim 1, wherein the converter pump comprises an air operated piston and cylinder assembly for providing reciprocating motion in response to the pressurized air; and a hydraulic piston and cylinder pump coupled to and driven by the air piston and cylinder assembly, said hydraulic piston and cylinder pump for pumping hydraulic fluid from the hydraulic reservoir to the hydraulic ram assembly.

8. The dump car according to claim 7, wherein the, air operated piston and cylinder assembly comprises at least one standard train brake air piston and cylinder, said train brake air piston and cylinder modified to receive the pressurized air and drive said hydraulic pump in response thereto.

9. The dump car according to claim 1, further comprising a pressure relief valve associated with the reservoir to maintain pressure in the reservoir below a predetermined pressure, said predetermined pressure being substantially less than the pressure of the pressurized fluid provided to the hydraulic ram assembly by the converter pump.

10. The dump car according to claim 1, wherein the reservoir serves as a supply source of hydraulic fluid and as a return vessel for the hydraulic fluid following use in the hydraulic ram assembly.

11. An improved hydraulically operated side railway dump car for transporting bulk material, the improvement comprising:

a converter pump driven by pressurized air from an air source associated with the dump car, said pump for pressurizing hydraulic fluid received from a hydraulic reservoir, said converter pump including at least one standard train brake air piston and cylinder modified to selectively receive the pressurized air; and a hydraulic pump operated by the train brake air piston and cylinder;

at least one hydraulic ram for tilting a portion of the dump car to cause dumping of the bulk material from the dump car; and a valve connected between the hydraulic pump and the at least one hydraulic ram to selectively cause pressurized hydraulic fluid to flow from the hydraulic pump to the at least one hydraulic ram.

12. A side dumping railway car for transporting bulk material comprising:

a plurality of wheels;

a car frame carried on said wheels;

a dump bed rotatably connected to the car frame;

at least one hydraulic ram pivotally connected between the car frame and the dump bed, to permit tilting of the dump bed relative to the car frame;

a reservoir carried by said dump car for and including hydraulic fluid;

a control valve assembly connected between the converter pump and the hydraulic ram for selectively providing pressurized hydraulic fluid directly from the converter pump assembly to the hydraulic ram to operate the hydraulic ram and tilt the dump bed; and wherein the hydraulic fluid does not communicate with means for storing pressurized hydraulic fluid.

13. A method for converting an existing railroad dump car having pneumatically operated tilting rams to a dump car having hydraulically operated tilting rams, said method comprising the steps of:

providing a hydraulic reservoir for supplying and receiving hydraulic fluid;

providing a converter pump;

powering the converter pump with pressurized air from a source of pressurized air associated with the dump car, the pump providing pressurized hydraulic fluid from the reservoir;

replacing the pneumatically operated tilting rams with hydraulically operated tilting rams;

selectively providing the pressurized hydraulic fluid from the converter pump to the hydraulically operated tilting rams; and arranging a flow of the hydraulic fluid such that the hydraulic fluid does not communicate with means for storing pressured hydraulic fluid.

14. The method of claim 13, wherein providing the converter pump further includes providing at least one standard train air brake piston and cylinder, said air brake piston and cylinder adapted to provide reciprocating motion in response to selective application of the pressurized air thereto.

* * * * *

UNITED STATES PATENT AND TRADEMARK OFFICE
CERTIFICATE OF CORRECTION

PATENT NO. : 6,192,804 B1
DATED : February 27, 2001
INVENTOR(S) : Edwin Snead

It is certified that error appears in the above-identified patent and that said Letters Patent is hereby corrected as shown below:

<u>Column 6,</u>
Line 23, "rein" should read -- wherein --.

<u>Column 7,</u>
Line 18, "for" should be deleted.

Signed and Sealed this

Nineteenth Day of March, 2002

JAMES E. ROGAN
*Director of the United States Patent and Trademark Office*